Figure 1:
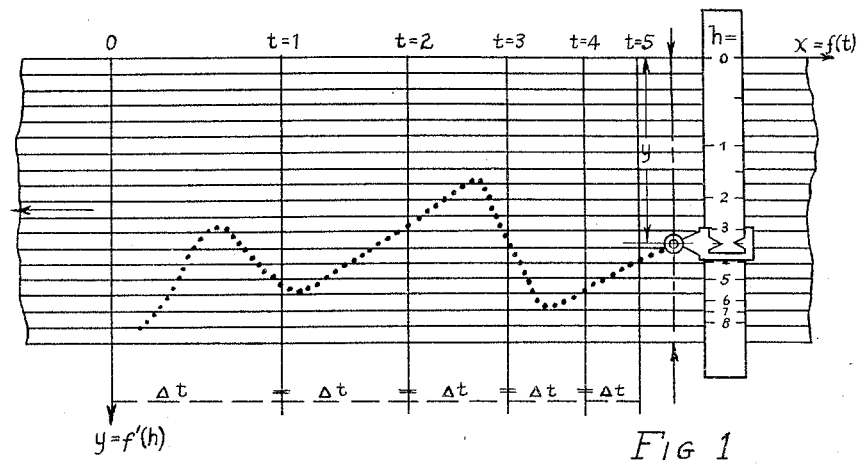

April 18, 1933.    C. DE BEAUMARCHAIS    1,904,719
RECORDING APPARATUS
Filed Dec. 11, 1930    3 Sheets-Sheet 1

INVENTOR
Charles de Beaumarchais.
BY
Cameron, Kerkam & Sutton
ATTORNEYS.

April 18, 1933. C. DE BEAUMARCHAIS 1,904,719
RECORDING APPARATUS
Filed Dec. 11, 1930   3 Sheets-Sheet 2

INVENTOR
Charles de Beaumarchais.
By
Cameron, Kerkam & Sutton
ATTORNEYS

April 18, 1933.   C. DE BEAUMARCHAIS   1,904,719
RECORDING APPARATUS
Filed Dec. 11, 1930    3 Sheets-Sheet 3

INVENTOR
Charles de Beaumarchais.
By
Cameron, Kerkam & Sutton.
ATTORNEYS.

Patented Apr. 18, 1933

1,904,719

UNITED STATES PATENT OFFICE

CHARLES DE BEAUMARCHAIS, OF PARIS, FRANCE, ASSIGNOR TO LE MATERIEL ELECTRIQUE S. W., OF PARIS, FRANCE, A CORPORATION OF FRANCE

RECORDING APPARATUS

Application filed December 11, 1930, Serial No. 501,692, and in France January 15, 1930.

The present invention refers to a semi-automatic method and apparatus for recording visual observations of a measuring apparatus upon a chart to produce a record of the variation of the measured values with respect to time.

It is often desirable to obtain a record of the variation of a phenomenon with respect to time. Such a record is usually made in the form of a curve in rectangular co-ordinates in which the abscissæ $x$ are designated as measures of the time $t$ and the ordinates $y$ indicate the variations of the phenomenon which are to be recorded. The values of $x$ may be directly proportional to the time or may be proportional to a function $f(t)$ of the time. Likewise, the values of $y$ may be proportional to values of $h$ indicated by the measuring apparatus, or may be proportional to some function $f'(h)$.

Such a record can most conveniently be made by a totally automatic apparatus which is, however, often too complicated and expensive for use in many cases. The only other manner in which such a record could heretofore be obtained was by providing an observer to mark on a suitably ruled chart various points corresponding to the variations of the observed phenomenon at more or less short time intervals. This latter procedure requires for each point of the record the simultaneous reading of two indications followed immediately by two recording operations. It is necessary, in fact, (1) to read the indication on the measuring apparatus, (2) to read the hour or observe on a chronometer or other time-measuring apparatus the moment when the indication is produced, (3) to mark on the chart the abscissa corresponding to the moment under consideration, (4) to follow on the chart the ordinate corresponding to this abscissa up to the horizontal which represents the value read on the measuring apparatus, and (5) finally, to mark the point.

Unless extremely constant and rigid attention is paid, such a mode of operation would give rise to numerous errors, especially where a rapid succession of indications must be recorded. Furthermore, this process makes it almost impossible to make directly any transformations of the indications read on the measuring apparatus even though such transformations are often useful.

An object of the present invention is to simplify this process. The present invention permits the indications observed on a measuring apparatus to be plotted point by point with great ease and without fatigue at very close intervals so as to produce substantially a continuous curve, and, furthermore, without additional work or attention to make desirable transformations of the observed indications.

The invention comprises in general the provision of means for moving a chart automatically at a speed proportional to the time or a function of the time, and a means for manually setting a recording point at the observed value indicated on the measuring instrument or at some function of this value.

According to the present invention, therefore, the process is semi-automatic. The apparatus can be adjusted instantaneously with respect to time, or the beginning of the time which characterizes the start of every period during which a record is to be made can be marked on the chart after which the time is registered automatically so that it is no longer necessary for the operator to occupy himself with the factor time. The operator need not be trained since he plays only an inferior part which consists in starting the apparatus at the desired moment and then simply in maintaining the recording point of the device in agreement with the indications read on the measuring apparatus. When the indications read have to be transformed, said transformations are effected automatically.

Figure 4:
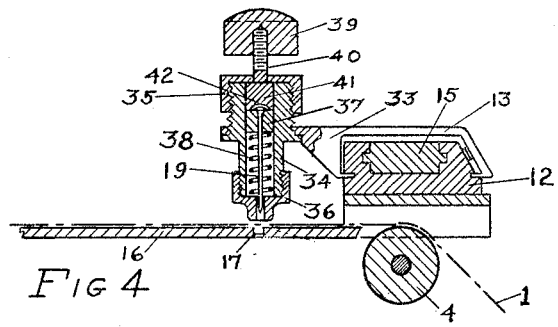
Figure 5:
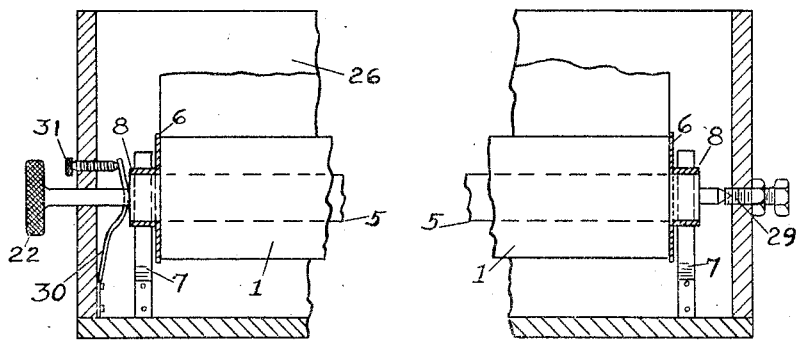
Figure 2:
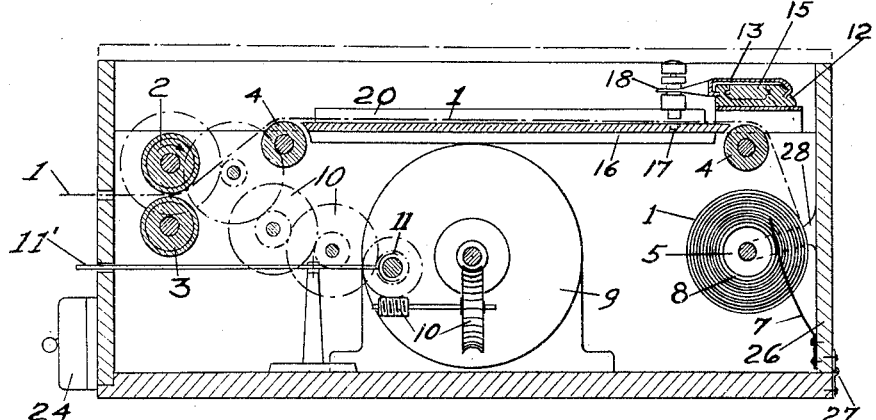
Figure 3:
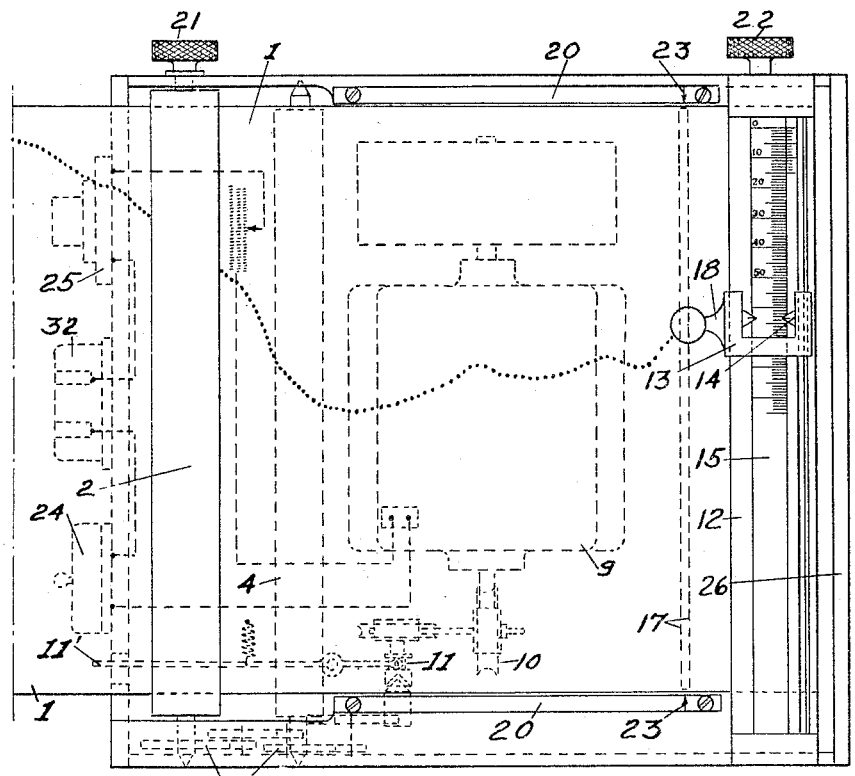
Figure 6:
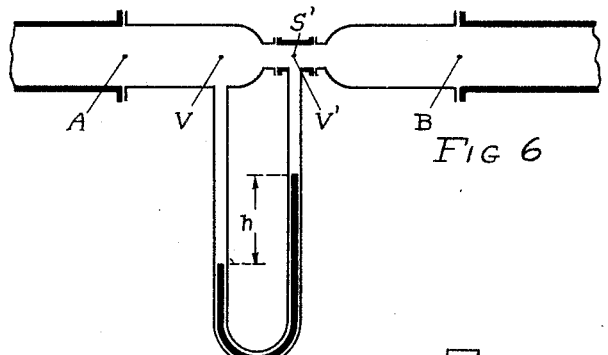
Figure 7:
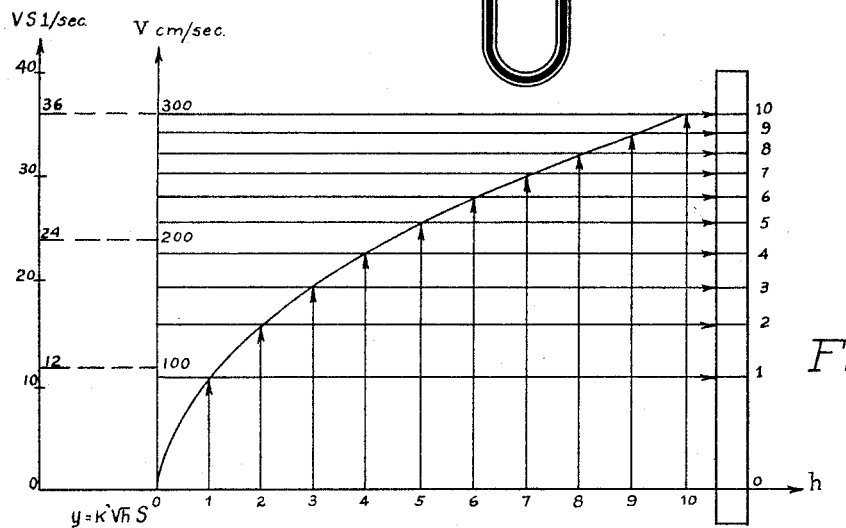
Figure 8:
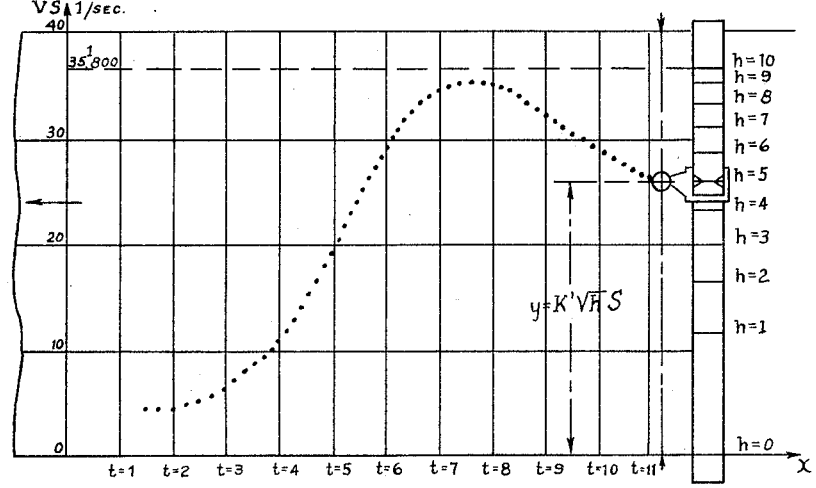

The invention may be described in more detail with reference to the drawings of which Figure 1 is a diagram showing the principles of the invention; Figure 2 represents a longitudinal section of the apparatus; Figure 2 represents a longitudinal section of the apparatus; Figure 3 is a corresponding plan view; Figure 4 shows a detail of the recording point; Figure 5 shows a detail of the support for the chart roller; Figure 6 shows a device to which the present invention may be applied; and Figures 7 and 8 represent charts showing a manner of applying the present invention.

Referring to Figures 2, 3, 4 and 5 the device comprises a mechanism for moving along a paper chart 1. This mechanism may be controlled electrically or actuated by clock work or other equivalent devices. The chart is wound on a spool 5, passes over guiding rollers 4 at the opposite ends of a plate 16, thence between two rollers 2 and 3 and out of the apparatus. The driving motor 9 through gears 10 causes roller 2 to revolve, thereby drawing the paper between rollers 2 and 3. These rollers are both covered by a sheath of rubber or other material which provides good adhesion. The spool 5, on which the paper is wound and which is shown in detail in Figure 5, may be provided with guiding flanges 6. The paper is kept under sufficient tension by means of two flexible springs 7 which bear on the hubs 8 of roller 5. The motion of the paper may be stopped by a disengagement device 11 controlled by lever 11'. Instead of using the friction rollers 2 and 3, the paper may be perforated along the edges and moved by raised point pulleys. A scale 12 graduated in desired units is disposed perpendicularly to the direction of movement of the paper strip and supports a movable runner 13 which is provided with a pointer 14 and a perforation device 18 which will be described in more detail later.

A graduated rule 15 may be provided to slide in scale 12 in order to make it possible to shift the zero line of the measurements. The horizontal plate 16 which is secured to the frame of the apparatus is provided with a groove 17 parallel to the scale 12 and situated beneath the perforating device 18. This groove makes it possible for the perforating point 19 to perforate the paper conveniently. Plate 16 is also provided with two guides 20 which can be adjusted in such a manner as to agree with the positions of the flanges of the paper spool 5. The perforation device 18 is shown in detail in Figure 4. The runner 13 has a projection 33 which supports a cylinder 34 having a cylindrical recess and being threaded externally at both ends. To the upper part of this cylinder is screwed a hood 35 perforated in its center while to the lower part there is screwed a cap 36 having a narrow central channel in which the perforating point 19 can move. The latter in the present example is shown as a simple pin or needle projecting through piston 37 and having its head clamped between two pistons 37 and 41, its pointed end being guided by cap 36. The piston 41 is provided with a cup-shaped recess in which the head of the needle fits. The piston 37 is supported by a helical spring 38 which, in turn, is supported by the cap 36. The upper end of the piston 41 is of smaller diameter than the lower portion of the piston and passes through the hood 35. On the upper end is screwed a push button 39.

This device permits the paper chart 1 to be perforated vertically simply by pressing on the push button 39 which pushes downwardly the two pistons 37 and 41 as well as the needle 19 by compressing the spring 38 which lowers the point of the needle 19 to a distance equal to the space $d$ between the push button 39 and the shoulder of the hood 35. The motion of the needle is, therefore, limited and is less than the distance D between the bottom of the channel 17 in the plate 16 and the point of the needle when in its initial position so that by means of a suitable regulation of the length of the needle, the latter perforates the paper without striking the bottom of the channel 17. The point 19 is therefore in no danger of becoming blunt. As soon as the push button 39 is released, the spring 38 returns the movable elements upward to their initial position. In this return movement the paper 1 can not rise because the lower cap 36 almost touches the surface of the paper. The point of the needle is therefore completely detached after each perforation so that no tearing away of the paper strip can be produced due to its displacement between two successive perforations. This particular arrangement of the perforating device admits, moreover, of the very rapid changing of the needle 19. It is merely necessary to unscrew hood 35, which carries with it the push button 39 and piston 41, in order to be able to withdraw the needle and replace the same by another.

In order to start the apparatus at any particular time abscissa it is merely necessary to displace the paper chart forward or backwards by releasing the clutch 11 which disengages the roller 2 from the motor gearing which then permits the paper to be moved by turning the knurled thumb screws 21 and 22 in the desired direction until the desired abscissa is beneath the needle 19. The clutch may then be engaged and switch 24 closed, thereby starting the motor, where-upon the paper strip will displace itself automatically at the desired speed.

The speed of the strip may be regulated electrically as in the example shown in the drawings by means of adjustable resistances controlled by the knurled knob 25, or mechanically by any other known means. When the paper spool 5 becomes empty a new spool of paper may readily be inserted. One wall 26 of the casing of the apparatus is provided with a hinge 27 whereby the side of the casing may be opened. In one of the adjacent sides of the casing an oblique groove 28 is provided as a guide for one end 22 of the shaft of the spool 5 while the latter is being removed or replaced. The other end of the shaft of the spool 5 is supported by an adjustable bearing 29 (see Figure 5). The shaft of the spool is kept in position in the bearing 29 by means of a spring 30 fastened to the opposite side of the casing and having its tension adjustable by means of screw 31. The springs 7 mounted on the side 26 of the casing also serve to hold the shaft of the spool 5 in place when the casing is closed.

Referring now to Figure 1 it is apparent that the paper chart will be moved along the abscissa axis proportionally to the time $t$ at a constant speed or proportionally to a function of the time $x=f(t)$ which may be a continuous or discontinuous periodic function. The speed of the chart will change therefore according to a law derived from the equation $x=f(t)$, this variation of speed being obtained by suitable electrical, mechanical or other known arrangement.

To facilitate the adjustment of the device, it is preferable where the speed is constant to represent equal intervals of time $\Delta t$ on the chart by equal abscissæ intervals. While in the case where the speed is variable, constant time intervals $\Delta t$ are as shown in Figure 1 represented by different abscissæ intervals which vary according to the law $x=f(t)$. The ordinates of the recording chart represent either values of $h$ read on the measuring apparatus or values of a function $y$ equal to $f'(h)$ as is the case for the example shown in Figure 1. The rule 15 is always graduated in values of $h$ read on the measuring apparatus, but the spacing of the graduations on the scale may be proportional to $h$ or proportional to a function $f'(h)$ which then expresses the transformation effected by the registering device from the indications read on the measuring instrument. Under these conditions various combinations are possible according to the functions $x=f(t)$ and $y=f'(h)$ being or not respectively proportional to $t$ and $h$.

A particularly interesting case is the one where the following proportionality to $t$ and to $h$ exists: namely, where the movement of the chart is effected at constant speed and the graduation of the rule is identical to that of the ordinates of the chart except at the beginning. Such a case occurs in the application of the present invention to submarine acoustic sounders where the measurements of depths are observed from visual indications which appear regularly in a rather rapid sequence on an indicating apparatus.

The present invention makes it possible for one to trace in a very simple manner practically continuous sounding lines with a minimum of attention on the part of the operator. By displacing the rule 15 relatively to the scale 12 by an amount equal to the draft of the vessel, the original of the ordinates are automatically corrected to give the correct depth of the water at the place in question.

The present invention, furthermore, furnishes the possibility of securing sounding curves which are not deformed by the variations of speed of the vessel and consequently are true profiles of the sea bottom, providing that a correction be made for the drift of the vessel due to ocean currents. To obtain such curves a certain length of the chart must always correspond to the same distance travelled by the vessel whatever may be the fluctuation of speed of the vessel. This result can be obtained by combining suitably the speed regulating means of the chart with the apparatus which measures the speed of the vessel in order to vary automatically the speed of the chart in proportion to that of the vessel.

Thus, by reckoning always on relative speeds one can for a basic speed of 20 knots regulate initially the speed of the chart so that it advances 10 millimeters per minute which defines for the curve the scale of the route passed over, that is to say one-third of a sea mile for an advance of the chart of 10 millimeters. When the speed of the vessel varies more or less relative to the basic speed of 20 knots, then the speed of the chart varies in proportion to that of the vessel, as indicated above, so that the 10 millimeters of displacement of the chart always represent one-third mile whatever may be the speed of the vessel.

It is also possible, owing to the slowness of the movement of the chart, to record upon the latter during the operation of the apparatus all useful notations concerning the position and the speed of the vessel as well as all observations which may subsequently be of interest in navigation or fishing.

In some instances it may also be desirable to use a chart which has not previously been graduated in time units since thereby the apparatus may be stopped when desired, thus avoiding unrolling great lengths of paper for the readjustment of the apparatus and also avoiding waste of paper and loss of time at the moment when one desires to utilize the device. In such a case it is preferable to employ simple millimeter paper which is commercially available and generally provides dark lines every 50 millimeters so that if one selects as a scale of the time units, 10 millimeters for each minute of time, every five minute interval and the hour intervals will be characterized by dark lines without previously graduating. It is thereby possible to effect an immediate adjustment and use the apparatus without delay when desired.

By means of the present invention the navigator is enabled even during the operation of sounding to have in front of him a considerable length of the recorded chart which is perfectly legible and corresponds to an important stretch of the vessel's course which may be useful for purposes of navigation or of fishing. It is also readily possible to make photographic reproductions of the sounding line since the perforations appear clearly on the photographic print.

The simple and compact apparatus hereinafter described can be used advantageously in all cases where an entirely automatic apparatus would be considered too expensive or too delicate. This is the case in submarine soundings where the apparatus is particularly suitable for trawlers for which economy is an absolute necessity and where no trained crew is at hand. The high purchasing cost and special requirements of upkeep of totally automatic apparatus are obstacles which ordinarily force such vessels to dispense with the recording of the soundings. The semi-automatic device herein described can be used by the captain of the trawler without making it necessary for him to call for assistance since he himself can bring about the recording of such portions of his course as may appear of importance to him, and he can note all the supplementary indications which he considers necessary. A series of facts can thus be quickly recorded which may later be of great advantage to him in the later course of the fishing.

The construction above described refers more particularly to sounding operations, but the present invention can be applied to all other situations where a record is desired, provided that in each case the registering chart and the rule be graduated conveniently. It might, for example, be necessary to record at short intervals the variable output of some fluid and particularly of water passing through a conduit. A known method of measuring water flow consists in making use of a Venturi meter, composed of a restricted conduit element interposed between two points A and B of the conduit through which the fluid passes and a manometric tube as is shown in Figure 6 of the drawings.

The Venturi meter does not measure output directly, but furnishes only the differences of pressure $h$ existing at any moment between two points at different sections of the conduit. Since the speed of the fluid and consequently the output are in proportion to this difference of pressure, it is necessary subsequently to transform the indications $h$ read on the manometric tube. In Figure 6, S and S' represent respectively some section of the conduit element in question and a section of the restricted or choke element. The speeds of the fluid in these two sections are respectively V and V' and correspond both to the same output $VS = V'S'$. The difference of pressure $h$ measured by the manometric tube in mercury height has the following expression:

$$h = \frac{V'^2 - V^2}{2g} \times \frac{1}{d}$$

where $g$ is the acceleration due to gravity and $d$ is the density of the mercury. Since the output of the two sections is constant, $$h = \frac{V^2\left[\left(\frac{S}{S'}\right)^2 - 1\right]}{2gd}$$

In other words $h$ is proportional to $V^2$ or $h = KV^2$ or by assuming $$K' = \frac{1}{\sqrt{K}}, V = K'\sqrt{h}.$$

This relation defines the mode of graduation of the rule and of the registering chart so that the diagram obtained represents directly the variations of the flow V in the section S, the said flow characterizing the output per unit cross section, or, better, the variations of the product VS, that is to say, of the total output.

Figures 7 and 8 of the accompanying drawings represent such a mode of graduation of the chart and the rule. The graduation of the rule 15 in values of $h$ is not linear, but follows the parabolic law of proportionality to the $\sqrt{h}$ and is graphically obtained from the curve of Figure 7 which expresses the relation $V = K'\sqrt{h}$. The graduations of the chart are, on the other hand, both linear, the abscissæ $x$ representing the time $t$ and the ordinates $y$ representing the outputs $K'\sqrt{h}S$ as is shown by Figure 8. This arrangement allows one to obtain directly a curve of the variations of outputs as a function of the time, even though the Venturi meter furnishes only differences of pressure which are proportional to the outputs to be recorded.

The present invention automatically effects the transformation required without any additional work for the operator whose duty is limited to that of maintaining the position of the runner on the rule so that it is always in agreement with the indications $h$ read on the manometric tube.

The arrangement shown in Figures 7 and 8 correspond to the following numerical example where $$S = 120 \ cm^2$$
$$g = 981 \frac{cm}{sec^2}$$
$$S' = 60 \ cm^2$$
$$d = 13.6$$
$$K' = 94.5$$

The parabolic graduation of the rule is then obtained from the curve of Figure 7 which expresses the relation $$V = 94.5\sqrt{h}$$

The linear graduation of the ordinates of the chart is obtained as shown in Figure 8 by determining one point of the graduation corresponding, for example, to the reading $h = 10$ cm. It is obvious, then, that $$V = 94.5\sqrt{10} = 298 \text{ cm. per second}$$

and the output $y = 298 \times 120 = 35.8$ liters per second.

Having now described the invention, what is claimed is:

1. In a recording device of the type including a moving chart, a device for perforating said chart comprising a plate rigidly mounted beneath said moving chart, a graduated rule supported by said plate in a position thereabove transverse to the direction of movement of said chart, whereby the chart may pass freely between said rule and said plate, a movable runner slidably mounted with respect to said rule, an elongated channel in said plate transverse to the direction of motion of said chart, a needle carried by said movable runner and normally positioned above said chart, means enabling depression of said needle for perforating said chart, the point of said needle entering said channel when in depressed position, and means for returning said needle to its initial position.

2. In a recording device of the type including a moving chart, a device for perforating said chart comprising a plate rigidly mounted beneath said moving chart, an elongated channel in said plate transverse to the direction of motion of said chart, a scale positioned over said chart fixed with respect to said plate and parallel to said channel, whereby the chart may move freely between said scale and said plate, a graduated rule slidably mounted on said scale, a slider arranged to be moved upon said scale and having a pointer registering with the graduations of said rule, a needle supported by said slider and normally positioned above said channel and adapted to be pushed through said chart into said channel, and means for returning said needle to its initial position.

3. In a recording device of the type employing a continuously moving chart upon which values are to be recorded at various times, the combination of a casing, a plate of substantial area rigidly mounted within said casing and across which the chart is adapted to be moved, a graduated rule supported by said plate in a position thereabove transverse to the direction of movement of said chart, whereby the chart may pass freely between said rule and said plate, a movable runner slidably mounted with respect to said rule, a pointer carried by said runner and registering with the graduations of said rule, and means carried by said runner for perforating the chart.

4. In a recording device of the type employing a continuously moving chart upon which values are to be recorded at various times, the combination of a casing, a plate of substantial area rigidly mounted within said casing and across which the chart is adapted to be moved, a graduated scale supported by said plate in a position thereabove transverse to the direction of movement of said chart, whereby the chart may pass freely between said scale and said plate, a graduated rule slidably mounted on said graduated scale, a movable runner slidably mounted with respect to said scale and having a pointer registering with the graduations of said rule, and means carried by said runner for perforating the chart.

In testimony whereof I affix my signature.

CHARLES DE BEAUMARCHAIS.